(12) United States Patent
Kwon et al.

(10) Patent No.: US 8,481,218 B2
(45) Date of Patent: Jul. 9, 2013

(54) HYDROGEN EXHAUST SYSTEM FOR FUEL CELL VEHICLE

(75) Inventors: Bu Kil Kwon, Gyeonggi-Do (KR); Hyun Joon Lee, Gyeonggi-Do (KR); Hyo Sub Shim, Gyeonggi-Do (KR); Se Kwon Jung, Gyeonggi-Do (KR); Yong Sun Park, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 623 days.

(21) Appl. No.: 12/624,869

(22) Filed: Nov. 24, 2009

(65) Prior Publication Data

US 2011/0048837 A1    Mar. 3, 2011

(30) Foreign Application Priority Data

Aug. 31, 2009    (KR) .................. 10-2009-0081178

(51) Int. Cl.
*H01M 8/06* (2006.01)
*H01M 8/04* (2006.01)
*B60K 1/00* (2006.01)

(52) U.S. Cl.
USPC ........... 429/415; 429/408; 429/413; 429/414; 429/428; 180/65.1

(58) Field of Classification Search
USPC .......... 429/428, 415, 408, 413, 414; 180/65.1
See application file for complete search history.

(56) References Cited

U.S. PATENT DOCUMENTS

| | | | | |
|---|---|---|---|---|
| 5,366,818 A | * | 11/1994 | Wilkinson et al. | 429/414 |
| 6,984,464 B2 | * | 1/2006 | Margiott et al. | 429/429 |
| 2004/0062975 A1 | | 4/2004 | Yamamoto et al. | |
| 2007/0207367 A1 | | 9/2007 | Fellows et al. | |

FOREIGN PATENT DOCUMENTS

| | | |
|---|---|---|
| JP | 2006-049202 A | 2/2006 |
| JP | 2008-034253 A | 2/2008 |
| KR | 10-2001-0089695 | 10/2001 |
| WO | 00/39877 A1 | 7/2000 |
| WO | 2008/052577 A1 | 5/2008 |

* cited by examiner

*Primary Examiner* — Patrick Ryan
*Assistant Examiner* — Julian Anthony
(74) *Attorney, Agent, or Firm* — Edwards Wildman Palmer LLP; Peter F. Corless

(57) ABSTRACT

The present invention provides a hydrogen exhaust system for a fuel cell vehicle, which is configured to actively control an exhaust path of hydrogen discharged from an anode of a fuel cell stack to maximize the safety of the vehicle by minimizing the possibility of explosion due to hydrogen exhaust and ensure the silence of the vehicle by minimizing noise generated during hydrogen exhaust. Moreover, the present invention provides a hydrogen exhaust system for a fuel cell vehicle, which can improve the performance and power of the fuel cell stack by supplying water discharged from the fuel cell stack to an air supply line of the fuel cell stack together with purge hydrogen discharged to a hydrogen exhaust line to increase the humidification performance of the fuel cell stack.

18 Claims, 5 Drawing Sheets

HYDROGEN EXHAUST SYSTEM FOR FUEL CELL VEHICLE

CROSS-REFERENCE TO RELATED APPLICATION

This application claims under 35 U.S.C. §119(a) the benefit of Korean Patent Application No. 10-2009-0081178 filed Aug. 31, 2009, the entire contents of which are incorporated herein by reference.

BACKGROUND (a) Technical Field

The present disclosure relates to a fuel cell system. More particularly, the present invention relates to a hydrogen exhaust system for a fuel cell vehicle, which exhausts hydrogen suitably discharged from an anode of a fuel cell stack.

(b) Background

A fuel cell system applied to a hydrogen fuel cell vehicle as an environmental friendly vehicle preferably comprises a fuel cell stack for suitably generating electricity by an electrochemical reaction of reactant gases, a hydrogen supply system ("fuel processing system") for suitably supplying hydrogen as a fuel to the fuel cell stack, an air supply system ("air processing system") for suitably supplying oxygen-containing air as an oxidant required for the electrochemical reaction in the fuel cell stack, a thermal management system for suitably removing reaction heat from the fuel cell stack to the outside of the fuel cell system, controlling operation temperature of the fuel cell stack, and performing water management function, and a system controller for suitably controlling the overall operation of the fuel cell system.

According to certain preferred embodiments, the hydrogen supply system preferably includes a hydrogen tank, high-pressure and low-pressure regulators, a hydrogen supply valve, an ejector, and a hydrogen recirculation system, the air supply system includes an air blower and a humidifier, and the thermal management system preferably includes an electric water pump (coolant pump), a water tank, and a radiator.

Preferably, in the hydrogen supply system, high-pressure hydrogen that is supplied from the hydrogen tank sequentially passes through the high-pressure and low-pressure regulators, and the pressure-reduced hydrogen is then supplied to the fuel cell stack. Preferably, in the hydrogen recirculation system, a hydrogen recirculation blower is suitably provided at an anode ("fuel electrode" or "hydrogen electrode") outlet of the fuel cell stack to recirculate unreacted hydrogen of the anode that is remaining after reaction to the anode, thereby recycling the hydrogen.

Preferably, nitrogen in the air supplied to a cathode ("air electrode" or "oxygen electrode") of the fuel cell stack and product water produced in the cathode during the operation of the fuel cell stack migrate to the anode through an electrolyte membrane (crossover phenomenon).

Accordingly, the nitrogen reduces the partial pressure of hydrogen to suitably degrade the performance of the fuel cell stack, and the product water clogs flow fields to impede the migration of hydrogen. Accordingly, it is necessary to ensure stable operation of the fuel cell stack by periodically purging the anode.

Therefore, in a typical fuel cell system, a hydrogen purge valve is suitably provided in a hydrogen exhaust line at the anode outlet of the fuel cell stack to suitably discharge foreign substances such as nitrogen and water that have accumulated in the anode.

Preferably, during the above-described purging process, the hydrogen purge valve (e.g., solenoid valve) that is suitably installed in the hydrogen exhaust line is periodically opened and closed in the form of on/off pulses such that the nitrogen and water that are accumulated in the anode are suitably discharged to the hydrogen exhaust line. Preferably, the hydrogen present in the anode is suitably discharged together with the nitrogen and water.

Preferably, the hydrogen discharged during the anode purge may cause a problem. When the concentration of hydrogen discharged from the anode is high, there is a risk of explosion.

Accordingly, to prevent the risk of explosion due to the hydrogen exhaust, it is necessary to suitably minimize or dilute the concentration of hydrogen discharged from the anode within the range of explosion. Conventionally, a diluter is suitably installed in the hydrogen exhaust line to suitably dilute the hydrogen with ambient air.

In certain examples where the diluter is used, the hydrogen is only mixed with air and discharged, but the absolute amount of hydrogen is not suitably reduced. Accordingly, when the fuel cell system is while the vehicle is stopped or travels at a low speed at a place where many vehicles are parked such as an indoor parking lot which is not well ventilated, the hydrogen discharged from the vehicle may be accumulated around the vehicle, which may increase the possibility of explosion.

Further, it may be necessary to additionally provide a pipeline or an air supply system for introducing air into the diluter, which results in an increase in the cost and the complexity of the pipeline.

Furthermore, a post-treatment system for treating the hydrogen discharged from the fuel cell stack may be used. Accordingly, a catalyst combustion type post-treatment system or a flame combustion type post-treatment system may preferably be used. However, these post-treatment systems introduce a large amount of air into a reactor to burn the hydrogen discharged from the fuel cell stack, and thus there are problems that the pipeline is suitably complicated, the load of the air blower is suitably increased, and a separate air supply system is suitably required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention preferably provides a hydrogen exhaust system for a fuel cell vehicle, which is suitably configured to actively control an exhaust path of hydrogen discharged from an anode of a fuel cell stack to suitably maximize the safety of the vehicle by minimizing the possibility of explosion due to hydrogen exhaust and ensure the silence of the vehicle by suitably minimizing noise generated during hydrogen exhaust.

Preferably, the present invention provides a hydrogen exhaust system for a fuel cell vehicle, which can suitably improve the performance and power of the fuel cell stack by supplying water discharged from the fuel cell stack to an air supply line of the fuel cell stack together with purge hydrogen discharged to a hydrogen exhaust line to suitably increase the humidification performance of the fuel cell stack.

In a preferred embodiment, the present invention provides a hydrogen exhaust system for a fuel cell vehicle, preferably including: a hydrogen exhaust line suitably provided at an anode outlet of a fuel cell stack; a hydrogen purge valve suitably provided in the hydrogen exhaust line; an outlet line as a part of the hydrogen exhaust line at a rear end of the hydrogen purge valve, the outlet line exhausting purge hydrogen that is suitably discharged by the hydrogen purge valve to an air exhaust line at a cathode outlet of the fuel cell stack; an inlet line branched from the outlet line and suitably exhausting purge hydrogen to an air supply line at a cathode inlet of the fuel cell stack; a vehicle state detector for suitably detecting a vehicle state; a controller for suitably outputting a control signal for selecting either the cathode outlet or the cathode inlet of the fuel cell stack as an exhaust path of purge hydrogen based on the vehicle state detected by the vehicle state detector; and a valve means that is capable of being opened and closed by a control signal of the controller to open one of flow paths of the inlet line and the outlet line such that purge hydrogen is discharged to either the cathode outlet or the cathode inlet of the fuel cell stack.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
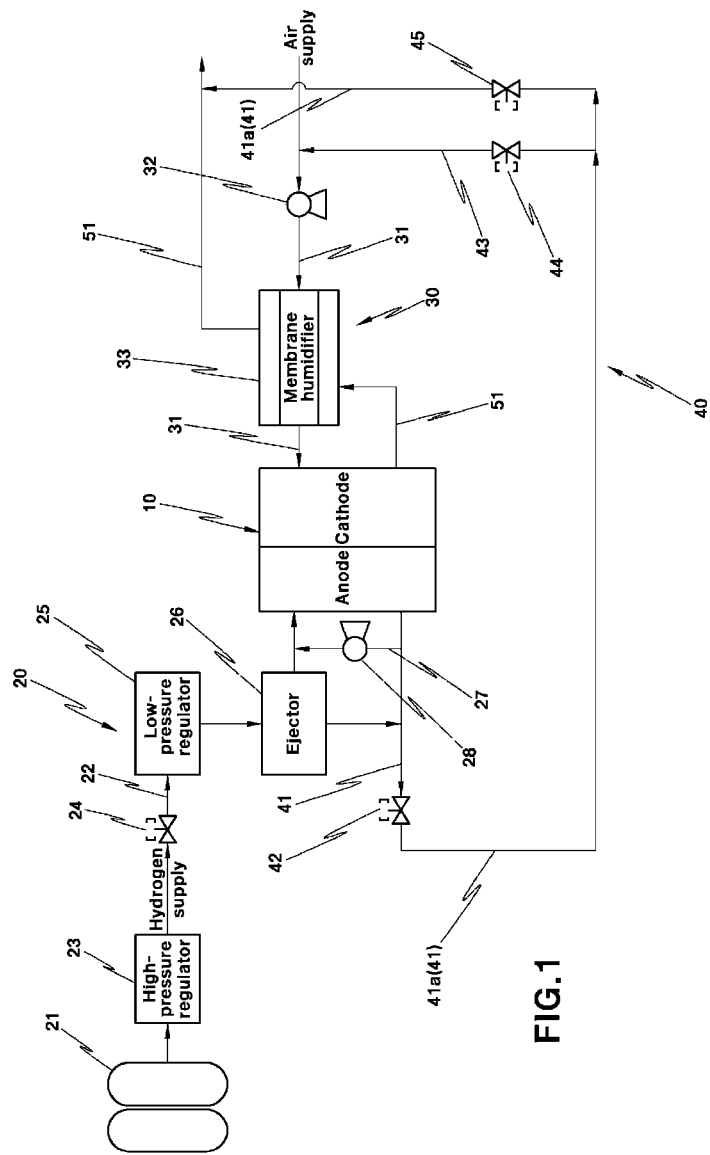
FIG. 1 is a configuration diagram of an exemplary fuel cell system to which a hydrogen exhaust system in accordance with a preferred embodiment of the present invention is applied.

Reference numerals set forth in the Drawings includes reference to the following elements as further discussed below:

| | | | |
|---|---|---|---|
| 1: | vehicle speed detector | 2: | power detector |
| 3: | controller | 10: | fuel cell stack |
| 20: | hydrogen supply system | 30: | air supply system |
| 31: | air supply line | 32: | air blower |
| 33: | membrane humidifier | 40: | hydrogen exhaust system |
| 41: | hydrogen exhaust line | 41a: | outlet line |
| 42: | hydrogen purge valve | 43: | inlet line |
| 44: | first valve | 45: | second valve |
| 51: | air exhaust line | 60: | water trap |
| 61: | water level sensor | 62: | water discharge line |
| 63: | water discharge valve | | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In a preferred aspect, the present invention features a hydrogen exhaust system for a fuel cell vehicle, comprising a hydrogen exhaust line, a hydrogen purge valve provided in the hydrogen exhaust line, an outlet line as a part of the hydrogen exhaust line at a rear end of the hydrogen purge valve, an inlet line branched from the outlet line, a vehicle state detector for detecting a vehicle state, a controller; and a valve means.

In one embodiment, the hydrogen exhaust line is provided at an anode outlet of a fuel cell stack.

In another embodiment, the outlet line exhausts purge hydrogen discharged by the hydrogen purge valve to an air exhaust line at a cathode outlet of the fuel cell stack.

In another further embodiment, the inlet line exhausts purge hydrogen to an air supply line at a cathode inlet of the fuel cell stack.

In still another further embodiment, the controller outputs a control signal for selecting either the cathode outlet or the cathode inlet of the fuel cell stack as an exhaust path of purge hydrogen based on the vehicle state detected by the vehicle state detector.

In another embodiment, the valve means is capable of being opened and closed by a control signal of the controller to open one of flow paths of the inlet line and the outlet line such that purge hydrogen is discharged to either the cathode outlet or the cathode inlet of the fuel cell stack.

The invention also features a motor vehicle comprising the hydrogen exhaust system for a fuel cell vehicle of any one of the aspects described herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In preferred embodiments, the present invention aims at providing a hydrogen exhaust system for a fuel cell vehicle, which exhausts hydrogen that is suitably discharged from an anode of a fuel cell stack. In particular preferred embodiments, the present invention preferably provides a hydrogen exhaust technology, which can ensure the safety of the vehicle by suitably diluting and exhausting hydrogen that is discharged from an anode of a fuel cell stack, ensure the silence of the vehicle by suitably minimizing noise generated during hydrogen exhaust, and suitably improve the performance and power of the fuel cell stack by suitably increasing the humidification performance of the fuel cell stack.

According to certain preferred embodiments and as shown in FIG. 1, FIG. 1 is a configuration diagram of a fuel cell system to which a hydrogen exhaust system in accordance with a preferred embodiment of the present invention is suitably applied, in which a fuel cell stack 10 for suitably generating electricity by an electrochemical reaction of reactant gases (such as hydrogen and oxygen), a hydrogen supply system 20 for suitably supplying hydrogen as a fuel to the fuel cell stack 10, an air supply system 30 for suitably supplying oxygen-containing air as an oxidant to the fuel cell stack 10, and a hydrogen exhaust system 40 for suitably exhausting hydrogen discharged from the fuel cell stack 10 are shown.

As shown in FIG. 1, the hydrogen supply system 20 may preferably include, but may not only be limited to, a hydrogen tank 21, a hydrogen supply line 22, high-pressure and low-pressure regulators 23 and 25, a hydrogen supply valve 24 (e.g., solenoid valve for start and stop), an ejector 26, a hydrogen recirculation line 27, and a recirculation blower 28.

In particular preferred embodiments, the air supply system 30 may include an air blower 32, an air supply line 31, and a humidifier 33. Preferably, the humidifier 33 may be a gas-to-gas membrane humidifier using hollow fiber membranes.

According to preferred embodiments of the present invention, the membrane humidifier 33 humidifies air supplied to a cathode inlet of the fuel cell stack 10 for the electrochemical reaction using a gas that is suitably discharged from a cathode outlet. Accordingly, in preferred embodiments, dry air supplied to the cathode of the fuel cell stack 10 by the air blower 32 and the air supply line 31 and humid gas discharged from the cathode of the fuel cell stack 10 through the air exhaust line 51 preferably pass through the membrane humidifier 33. As a result, the dry air is suitably humidified by water exchange between the dry air passing through the inside of the hollow fiber membranes and the humid gas passing through the outside of the hollow fiber membranes.

In certain preferred embodiments, the hydrogen exhaust system 40 in accordance with the present invention is suitably configured to actively control a hydrogen exhaust path based on the vehicle state, especially, based on the vehicle speed and may preferably include a hydrogen exhaust line 41, a hydrogen purge valve 42, an outlet line 41a, and an inlet line 43.

In certain preferred embodiments, the hydrogen exhaust line 41 and the hydrogen purge valve 42 are to discharge foreign substances such as nitrogen and water accumulated in the anode of the fuel cell stack 10, and the foreign substances and purge hydrogen (during hydrogen purge) discharged from the anode of the fuel cell stack 10 flow through the hydrogen exhaust line 41 connected to the anode outlet of the fuel cell stack 10 by the periodical opening and closing operations of the hydrogen purge valve 42.

According to further preferred embodiments, the hydrogen exhaust line 41 is suitably connected to an exhaust line at the cathode ("air electrode" or "oxygen electrode") outlet of the fuel cell stack 10, i.e., the air exhaust line 51, and thus the foreign substances and purge hydrogen discharged from the anode ("fuel electrode" or "hydrogen electrode") of the fuel cell stack 10 to the hydrogen exhaust line 41 move to the air exhaust line 51 to be suitably diluted with air discharged from the cathode of the fuel cell stack 10 and are then suitably discharged to the outside.

Accordingly, in the present specification, a part of the hydrogen exhaust line 41, that is suitably connected to the air exhaust line 51 at the rear end of the hydrogen purge valve 42, will preferably be described separately from a part of the hydrogen exhaust line 41 at the front end of the hydrogen purge valve 42, identified with reference numeral 41a, and will be suitably referred to as an outlet line for a better understanding of the present invention.

Preferably, the outlet line 41a is a pipeline for exhausting purge hydrogen to the cathode outlet of the fuel cell stack 10 when the vehicle travels at suitably high speed or when the fuel cell stack 10 suitably outputs high power as described herein.

According to certain preferred embodiments, the outlet line 41a may preferably be connected to either the air exhaust line 51 at the front end of the membrane humidifier 33 or the air exhaust line 51 at the rear end of the membrane humidifier 33 so as to suitably exhaust the purge hydrogen discharged to the hydrogen exhaust line 41 to the cathode outlet of the fuel cell stack 10 by the opening and closing operations of the hydrogen purge valve 42.

Preferably, the inlet line 43 is a separate exhaust line that is suitably branched from the outlet line 41a of the hydrogen exhaust line 41 at the rear end of the hydrogen purge valve 42 and is suitably connected to the air supply line 31. According to certain preferred embodiments, the inlet line 43 is used to exhaust the hydrogen (purge hydrogen) discharged from the anode of the fuel cell stack 10 during purge to the cathode inlet of the fuel cell stack 10. Preferably, the purge hydrogen is suitably introduced to the air supply line 31 through the inlet line 43 to be supplied to the cathode inlet of the fuel cell stack 10, thus passing through the inside of the cathode of the fuel cell stack 10.

In further preferred embodiments, the inlet line 43, as will be described later, is preferably used to exhaust the purge hydrogen, suitably discharged when the vehicle is stopped or travels at a speed lower than a predetermined reference speed, to the cathode inlet of the fuel cell stack 10. Preferably, when the hydrogen exhaust path is suitably controlled more specifically based on the power of the fuel cell stack 10, the inlet line 43 suitably exhausts the purge hydrogen, discharged when the vehicle travels at a speed lower than the reference speed and when the fuel cell stack 10 outputs low power, to the cathode inlet of the fuel cell stack 10.

According to certain preferred embodiments, the inlet line 43 may be suitably connected to the air supply line 31 at either the front end or the rear end of the membrane humidifier 33 or to the air supply line 31 at either the front end or the rear end of the air blower 32 so as to suitably exhaust the purge hydrogen discharged through the hydrogen exhaust line 41 and the hydrogen purge valve 42 to the cathode inlet of the fuel cell stack.

Figure 2:
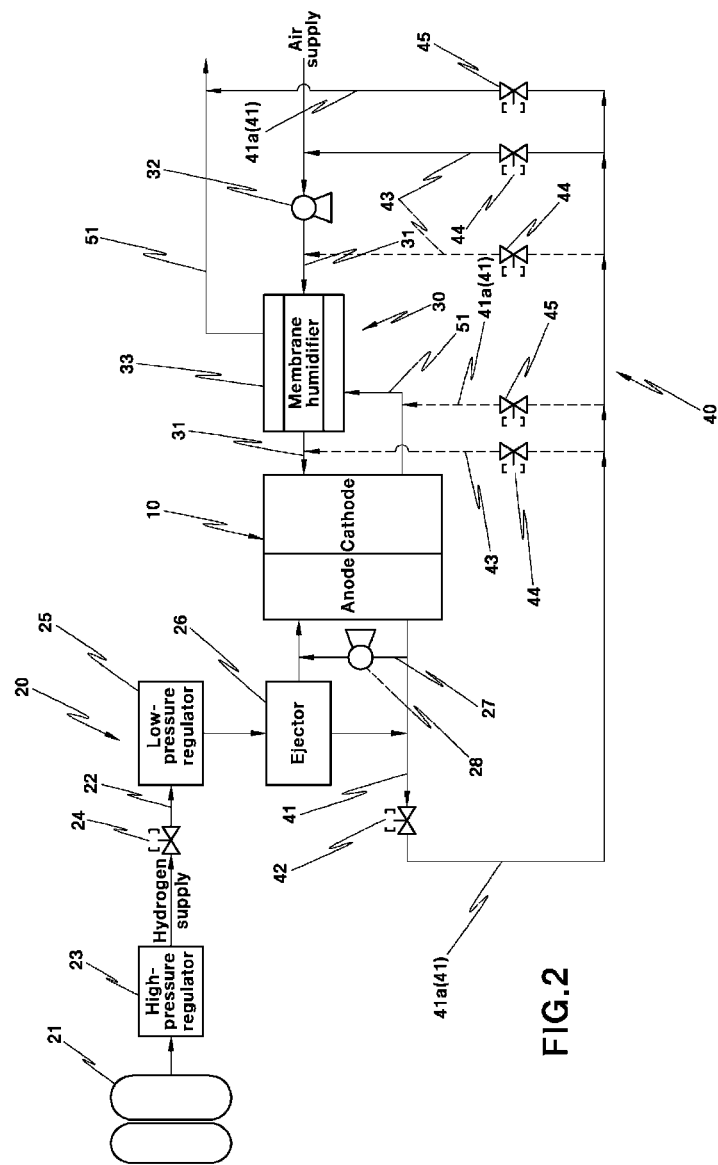
FIG. 2 is a configuration diagram of an exemplary fuel cell system to which a hydrogen exhaust system in accordance with a preferred embodiment of the present invention is applied, in which examples of various pipes such as an outlet line and an inlet line are shown.

FIG. 2 is a configuration diagram of a fuel cell system according to certain exemplary embodiments, to which a hydrogen exhaust system in accordance with a preferred embodiment of the present invention is suitably applied, where examples of various pipes such as the outlet line 41a and the inlet line 43 are shown.

According to certain preferred embodiments and as shown in FIG. 2, the outlet line 41a may preferably be connected to the air exhaust line 51 at either the front end or the rear end of the membrane humidifier 33, and the inlet line 43 may preferably be connected to the air supply line 31 at either the front end or the rear end of the membrane humidifier 33 or to the air supply line 31 at either the front end or the rear end of the air blower 32. According to further exemplary embodiments, and as shown in the example of FIG. 2, since the air blower 32 is preferably located forward and the membrane humidifier 33 is preferably located backward relative to the air supply direction, the front end of the membrane humidifier 33 and the rear end of the air blower 32 suitably correspond to the same air supply line 31, and thus there may be a total of three kinds of inlet lines 43 as shown in FIG. 2.

Accordingly, in the present invention, the purge hydrogen that is suitably discharged through the hydrogen exhaust line 41 from the anode of the fuel cell stack 10 is preferably exhausted through either the outlet line 41a or the inlet line 43, and thus is selectively discharged to either the cathode outlet or the cathode inlet of the fuel cell stack 10. Accordingly, a valve for opening and closing the flow path is suitably provided in the outlet line 41a and the inlet line 43 to select the exhaust path.

Figure 3:
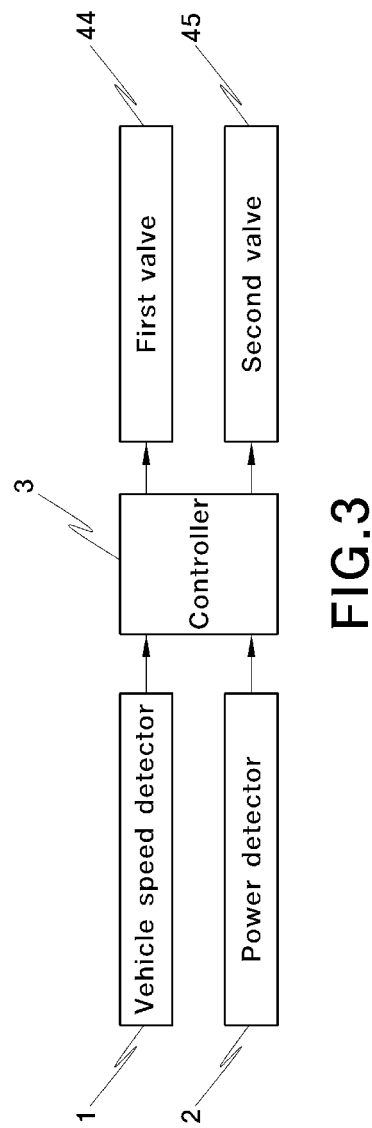
FIG. 3 is a block diagram showing a configuration of a control system of a hydrogen exhaust system in accordance with a preferred embodiment of the present invention.

Preferably, a first valve 44 is suitably provided in the inlet line 43 and a second valve 45 is suitably provided in the outlet line 41a, and an electronic valve (e.g., solenoid valve) capable of being opened and closed by a control signal of a controller 3 may preferably be used as the first and second valves 44 and 45 (refer to FIG. 3).

According to further preferred embodiments, with the above-described configuration of the present invention, it is possible to selectively exhaust the purge hydrogen to either the cathode inlet through the inlet line 43 or to the cathode outlet through the outlet line 41a.

In certain exemplary embodiments, when the first valve 44 is opened while the second valve 45 is closed, the purge hydrogen, that is suitably discharged from the anode of the fuel cell stack 10 during opening of the hydrogen purge valve 42, is suitably exhausted to the cathode inlet through the inlet line 43.

Preferably, the purge hydrogen discharged to the cathode inlet through the inlet line 43 is suitably supplied to the cathode of the fuel cell stack 10 together with the air supplied through the air supply line 31 and then is suitably oxidized by a catalyst in the cathode.

Preferably, in further preferred embodiments, since the purge hydrogen that is preferably supplied to the cathode of the fuel cell stack 10 is suitably oxidized by the cathode catalyst and removed, it is possible to minimize or eliminate the amount of hydrogen that is suitably discharged to the outside of the vehicle, and thus it is possible to ensure the safety of the vehicle without the use of any hydrogen diluter or combustion system (post-treatment system). Preferably, since the front end of the fuel cell stack 10, i.e., the cathode inlet of the fuel cell stack 10, is selected to preferably discharge hydrogen, it is possible to suitably minimize noise generated during hydrogen exhaust, and thus it is possible to suitably ensure the silence of the vehicle.

In other certain embodiments, when the second valve 45 is opened while the first valve 44 is closed, the purge hydrogen, suitably discharged from the anode of the fuel cell stack 10 during opening of the hydrogen purge valve 42, is suitably exhausted to the cathode outlet through the outlet line 41, diluted with air discharged through the air exhaust line 51, and is then suitably discharged to the outside.

Accordingly, in the present invention, the controller 3 preferably controls the first valve 44 of the inlet line 43 and the second valve 45 of the outlet line 41a to suitably select the exhaust path of hydrogen discharged from the anode of the fuel cell stack 10 by the operation of the hydrogen purge valve 42. Preferably, in the present invention, the exhaust path of purge hydrogen is actively controlled based on the vehicle state, preferably, based on the vehicle speed during the operation of the fuel cell stack.

Accordingly, in certain preferred embodiments, when the vehicle travels at a speed lower than a predetermined reference speed, the purge hydrogen is suitably discharged to the cathode inlet of the fuel cell stack 10 through the inlet line 43 and, when the vehicle travels at a speed higher than the reference speed, the purge hydrogen is suitably discharged to the cathode outlet of the fuel cell stack 10 through the outlet line 41a.

Accordingly, the hydrogen exhaust system 40 of the present invention preferably includes a vehicle speed detector 1 for suitably detecting the vehicle speed as a vehicle state detector for detecting the current vehicle state and the controller 3 for controlling the state of the first and second valves 44 and 45 to select the hydrogen exhaust path based on the vehicle speed detected by the vehicle speed detector 1. Preferably, the controller 3 may not be a separate controller but may be a fuel cell system controller.

In preferred embodiments of the present invention, the controller 3 suitably compares the vehicle speed detected by the vehicle speed detector 1 with a predetermined reference speed and, if it is determined that the vehicle travels at a speed lower than the reference speed, suitably closes the second valve 45 and suitably opens the first valve 44 such that the purge hydrogen discharged from the anode of the fuel cell stack 10 is suitably exhausted to the cathode inlet through the inlet line 43.

Preferably, the purge hydrogen discharged to the cathode inlet of the fuel cell stack 10 in the above-described manner is suitably supplied to the cathode of the fuel cell stack 10 together with the air supplied through the air supply line 31 to the fuel cell stack 10 for the electrochemical reaction, and is then preferably oxidized and removed by a cathode electrode while passing through the cathode.

Conventionally, if there is no post-treatment system for suitably treating the exhausted hydrogen, when the fuel cell system is operated is while the vehicle is stopped or travels at a low speed at a place where many vehicles are parked such as an indoor parking lot which is not well ventilated, the hydrogen that is suitably discharged from the vehicle to the outside may be accumulated, which then suitably increases the possibility of explosion. However, in the present invention, the hydrogen is suitably passed through the cathode to be oxidized and removed by the cathode electrode under the same condition, and thus it is possible to ensure the safety of the vehicle without the use of the post-treatment system.

In other embodiments of the present invention, when it is determined that the vehicle travels at a speed higher than the reference speed based on the vehicle speed detected by the vehicle speed detector 1, the controller 3 suitably closes the first valve 44 and suitably opens the second valve 45 such that the purge hydrogen that is discharged from the anode of the fuel cell stack 10 is suitably exhausted to the cathode outlet through the outlet line 41a.

Preferably, the purge hydrogen that is discharged to the cathode outlet is suitably diluted with air, discharged from the cathode of the fuel cell stack 10 and flowing through the air exhaust line 51, and is then suitably discharged to the outside of the vehicle.

Preferably, while the purge hydrogen is suitably discharged to the outside of the vehicle, if the vehicle speed is low, the hydrogen that is suitably discharged to the outside of the vehicle may be accumulated around the vehicle due to a low diffusion rate, which increases the possibility of explosion. Contrarily, if the vehicle speed is suitably increased above the reference level, the diffusion rate of hydrogen discharged is suitably increased, and thus there is no possibility of explosion even if the purge hydrogen is suitably discharged to the outside of the vehicle (after being diluted with air).

Accordingly, in the present invention, only when the vehicle travels at a high speed in which there is no possibility of explosion, the purge hydrogen is suitably discharged to the cathode outlet and then suitably discharged to the outside of the vehicle, which is a characteristic feature of the present invention. Accordingly, it is possible to prevent a large amount of purge hydrogen from being supplied to the cathode of the fuel cell stack 10, thereby preferably preventing the performance of the fuel cell stack 10 from being suitably degraded. Preferably, when the vehicle is stopped or travels at a speed lower than the reference speed, the purge hydrogen is suitably discharged to the cathode inlet of the fuel cell stack 10 to be supplied to the cathode and oxidized by the cathode electrode, thereby suitably ensuring the safety of the vehicle as described above.

According to preferred embodiments as described herein, the first valve 44 and the second valve 45 are valve means suitably capable of being opened and closed by a control signal of the controller 3 to suitably open one of the flow paths (exhaust path of purge hydrogen) of the inlet line 43 and the outlet line 41a and suitably close the other flow path such that the purge hydrogen is suitably discharged to either the cathode inlet or the cathode outlet of the fuel cell stack 10.

According to preferred embodiments of the present invention, although the first valve 44 and the second valve 45 may preferably be used as the valve means in the above-described manner, a switching valve that is preferably provided in a position where the inlet line 43 is branched from the outlet line 41a and selectively switching the exhaust direction of purge hydrogen to one of the flow paths of the inlet line 43 and the outlet line 41a may be used, instead of providing the first and second valves 44 and 45 in the inlet and outlet lines 43 and 41a, respectively.

Preferably, in further exemplary embodiments, the switching valve, a three-way valve (not shown) for selectively controlling the exhaust direction of purge hydrogen by a control signal of the controller 3 may be used. In other further preferred embodiments, the three-way valve selectively opens one of the flow paths of the inlet line 43 and the outlet line 41a such that the purge hydrogen is suitably discharged to either the cathode inlet through the inlet line 43 or to the cathode outlet through the outlet line 41a.

Preferably, even when the vehicle travels at a speed lower than the reference speed (in which the purge hydrogen is discharged to the cathode of the fuel cell stack), the fuel cell may be suitably operated at high power while the vehicle is traveling on a slope. Accordingly, the number of times of the purging process by the hydrogen purge valve 42 is suitably increased when the fuel cell is operated at high power, and thus the amount of purge hydrogen supplied to the cathode of the fuel cell stack is suitably increased.

Preferably, when the amount of purge hydrogen introduced into the cathode is suitably increased, the performance of the fuel cell stack may be suitably degraded. Accordingly, it is preferable that the exhaust path of purge hydrogen is set to the cathode outlet of the fuel cell stack when the fuel cell is operated at high power, even if the vehicle speed is below the reference speed.

Preferably, the hydrogen exhaust system 40 in accordance with preferred embodiments of the present invention may further include a power detector 2 for detecting the power of the fuel cell stack 10 as shown in FIG. 3. Accordingly, if it is determined that the power of the fuel cell stack 10 is above a predetermined reference level based on a value detected by the power detector 2, the controller 3 selects the cathode outlet of the fuel cell stack 10 as the exhaust path of purge hydrogen.

Preferably, if it is determined that the vehicle is stopped or travels at a speed lower than the reference speed based on the vehicle speed suitably detected by the vehicle speed detector 1, the controller 3 suitably compares the power of the fuel cell stack 10 obtained from a signal of the power detector 2 with a predetermined reference level and, if it is determined that the power of the fuel cell stack 10 is above the reference level, exhausts the purge hydrogen to the cathode outlet of the fuel cell stack 10, not to the cathode inlet of the fuel cell stack 10, thereby ensuring stable operation of the fuel cell stack 10.

Accordingly, in the same manner as during high-speed traveling, the controller 3 suitably closes the first valve 44 and suitably opens the second valve 45 such that the purge hydrogen discharged from the anode of the fuel cell stack 10 is exhausted to the cathode outlet through the outlet line 41a. In further preferred embodiments, the purge hydrogen that is suitably discharged to the cathode outlet is suitably diluted with air, discharged from the cathode of the fuel cell stack 10 and flowing through the air exhaust line 51, and is then suitably discharged to the outside of the vehicle.

In other exemplary embodiments, for example in the case where the power of the fuel cell stack 10 is suitably high, the vehicle is likely to travel on a slope rather than in an indoor parking lot, and the amount of air discharged from the cathode of the fuel cell stack 10 is suitably increased compared with the low-power state. Accordingly, it is preferable that the purge hydrogen is not supplied to the cathode of the fuel cell stack 10 but is suitably diluted with air discharged through the air exhaust line 51 and suitably discharged to the outside of the vehicle.

Preferably, while the vehicle is stopped or travels at a speed lower than the reference speed, if the power of the fuel cell stack 10 is suitably below the reference value, the controller 3 suitably closes the second valve 45 and suitably opens the first valve 44 such that the purge hydrogen is discharged to the cathode inlet (air supply line) of the fuel cell stack 10 to be supplied to the cathode of the fuel cell stack 10 and oxidized by the cathode electrode.

According to further exemplary embodiments of the invention and as shown in FIG. 3, FIG. 3 is a block diagram showing an exemplary configuration of a control system of the hydrogen exhaust system 40 in accordance with a preferred embodiment of the present invention, in which the vehicle speed detector 1, the power detector 2, the controller 3 for outputting a control signal with reference to output signals of the vehicle speed detector 1 and the power detector 2, and the first valve 44 and the second valve 45, which are opened and closed by the control signal of the controller 3 to select the hydrogen exhaust path, are shown.

Preferably, the vehicle speed detector 1 corresponds to a vehicle speed sensor suitably mounted in the vehicle, and the power detector 2 for detecting the power of the fuel cell stack 10 may be a current sensor for suitably detecting a current of the fuel cell stack 10. Preferably, the controller 3 suitably determines that the vehicle travels at a high speed if the vehicle speed detected by the vehicle speed sensor is above a predetermined reference speed and determines that the vehicle travels at a low speed if the vehicle speed detected by the vehicle speed sensor is below the reference speed.

Accordingly, a preferred object of the present invention is to optimally control the hydrogen exhaust path based on the traveling state of the vehicle and the operation state of the fuel cell stack so as to suitably minimize the risk due to hydrogen leakage to the outside of the vehicle, thereby suitably ensuring the safety of the vehicle.

Under certain conditions where the vehicle travels at a high speed or where the power of the fuel cell stack 10 is suitably high while the vehicle travels at a low speed, the exhaust path of hydrogen discharged from the cathode is set to the cathode outlet of the fuel cell stack 10, not to the cathode inlet of the fuel cell stack 10, thereby suitably preventing the performance of the fuel cell stack 10 from being degraded by a large amount of hydrogen (purge hydrogen) supplied to the cathode of the fuel cell stack 10.

Figure 4:
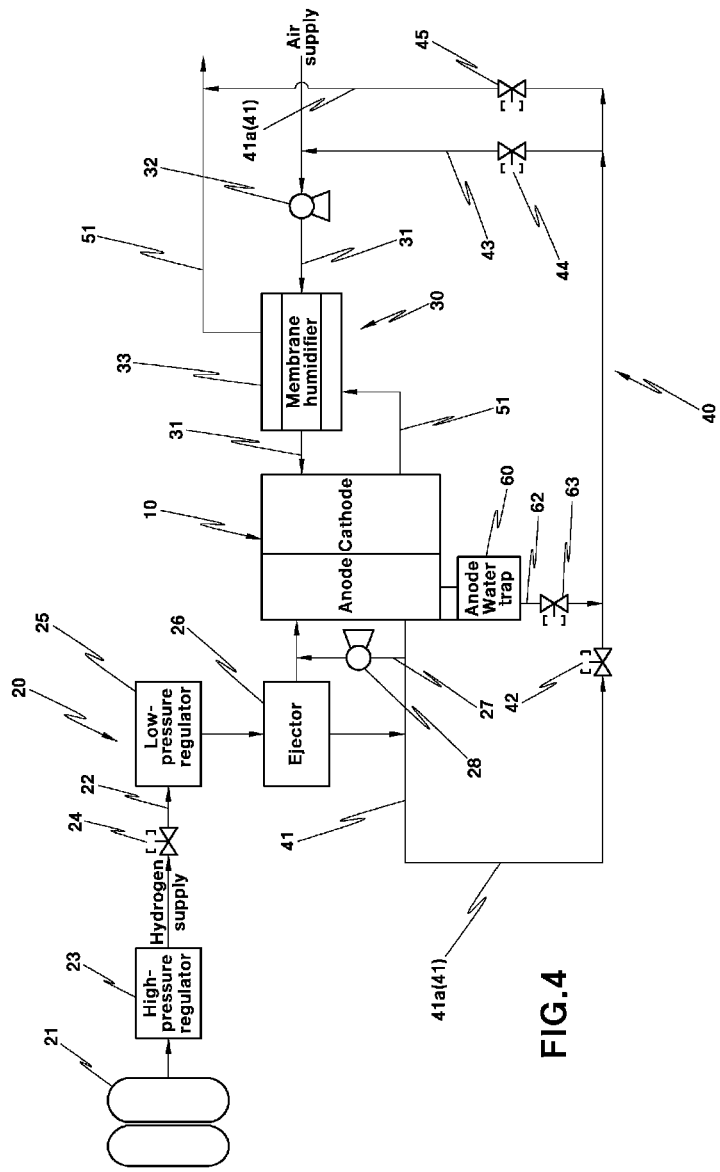
FIG. 4 is a configuration diagram of a fuel cell system to which a hydrogen exhaust system in accordance with a preferred embodiment of the present invention is applied, in which an anode water trap is connected.
Figure 5:
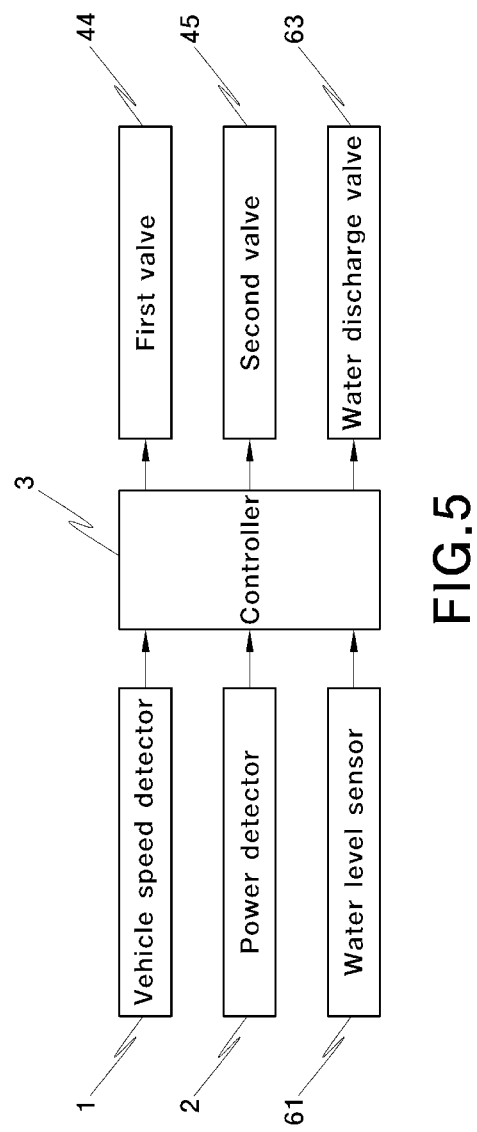
FIG. 5 is a block diagram showing a configuration of a control system of a hydrogen exhaust system of FIG. 4.

In other exemplary embodiments, for example as shown in FIG. 4, FIG. 4 is an exemplary configuration diagram of a fuel cell system to which the hydrogen exhaust system 40 in accordance with a preferred embodiment of the present invention is suitably applied, in which an anode water trap is connected. FIG. 5 is a block diagram showing an exemplary configuration of a control system of the hydrogen exhaust system 40 of FIG. 4, which suitably improves humidification performance by humidifying air using water collected from the anode ("fuel electrode" or "hydrogen electrode").

Preferably, and as shown in FIGS. 4 and 5, the hydrogen exhaust system 40 of the present invention further includes a configuration for humidifying air using water collected from the anode.

Preferably, the hydrogen exhaust system 40 further includes a water discharge line 62 that is suitably connected from a water outlet port of a water trap 60 to the hydrogen exhaust line 41 at the rear end of the hydrogen purge valve 42 and a water discharge valve 63 suitably installed in either the water outlet port of the water trap 60 or the water discharge line 62.

Preferably, in further certain embodiments of the present invention, the water trap 60 is used to collect water produced in the fuel cell stack 10 and discharge the collected water, the water trap 60 being suitably installed at the bottom of the fuel cell stack 10 and including a water level sensor (not shown in FIG. 4) for detecting the water level inside the water trap 60.

Preferably, water separated from a mixed gas (containing $H_2$) suitably discharged from the anode is collected in the water trap 60 and discharged to the outside when more than a certain amount of water is filled in the water trap 60.

In further preferred embodiments, the water discharge valve 63 is used to suitably control the water discharge through the water discharge line 62. In further related embodiments, like the first and second valves 44 and 45, an electronic valve (e.g., solenoid valve) that is capable of being opened and closed by a control signal of the controller 3 may preferably be used as the water discharge valve 63.

Preferably, in the above-described configuration, if it is determined that more than a certain amount of water is collected in the water trap 60 based on a signal of the water level sensor 61, the controller 3 suitably opens the water discharge valve 63 to discharge the water through the water discharge line 62 and closes the water discharge valve 63 when all the water is discharged.

Preferably, according to further preferred embodiments, while the water is suitably discharged from the water trap 60 in the above-described manner, if the purge hydrogen discharged by opening the hydrogen purge valve 42 is suitably exhausted to the cathode inlet of the fuel cell stack 10 while the first valve 44 is opened and the second valve 45 is closed, the water discharged from the water trap 60 may be supplied to the air supply line 31 of the cathode inlet.

Accordingly, when the cathode inlet of the fuel cell stack 10 is suitably selected as the hydrogen exhaust path at the same time when the water is discharged from the water trap 60, the water discharged from the water trap 60 is suitably supplied to the air supply line 31 installed at either the front end or the rear end of the membrane humidifier 33 or at either the front end or the rear end of the air blower 32 through the hydrogen exhaust line 41 at the rear end of the hydrogen purge valve 42 and the inlet line 43 connected thereto, thereby humidifying the air supplied through the air supply line 31 to the cathode of the fuel cell stack 10.

According to further preferred embodiments, when the water discharge line 62 is suitably connected to the hydrogen exhaust line 41 at the rear end of the hydrogen purge valve 42, the water in the water trap 60 can be injected into the hydrogen exhaust line 41 by the exhaust hydrogen (purge hydrogen) passing through the hydrogen exhaust line 41. The water injected into the hydrogen exhaust line 41 from the water discharge line 62 is supplied to the air supply line 31 through the inlet line 43 and humidifies air.

Further, in a preferred embodiment, when the controller 3 opens the water discharge valve 63 to discharge the water in the water trap 60 to the hydrogen exhaust line 41 through the water discharge line 62, the controller 3 may periodically open and close the water discharge valve 63 such that a predetermined amount of water in the water trap 60 is periodically discharged.

Preferably, when a predetermined amount of water in the water trap 60 is periodically supplied in the above-described manner, the water can be periodically and continuously supplied, which is advantageous in view of the humidification performance.

As described herein, according to the hydrogen exhaust system for a fuel cell vehicle of the present invention, which is preferably configured to actively control the exhaust path of hydrogen discharged from the anode of the fuel cell stack, it is possible to suitably maximize the safety of the vehicle by suitably minimizing the possibility of explosion due to hydrogen exhaust and ensure the silence of the vehicle by minimizing noise generated during hydrogen exhaust.

Further, since the water discharged from the fuel cell stack is suitably supplied to the air supply line of the fuel cell stack together with purge hydrogen discharged to the hydrogen exhaust line, it is possible to suitably increase the humidification performance of the fuel cell stack, thereby suitably improving the performance and power of the fuel cell stack.

Furthermore, according to preferred embodiments of the present invention, while the anode exhaust gas of the fuel cell stack is suitably supplied to the cathode of the fuel cell stack to be oxidized, the purge hydrogen is suitably exhausted to the cathode outlet through the outlet line under certain conditions where the vehicle travels at a high speed or where the power of the fuel cell stack is high when the vehicle travels at a low speed, and thus it is possible to ensure stable operation of the fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell system for a fuel cell vehicle, comprising:
a hydrogen exhaust line provided at an anode outlet of a fuel cell stack;
a hydrogen purge valve provided in the hydrogen exhaust line;
an outlet line as a part of the hydrogen exhaust line at a rear end of the hydrogen purge valve, the outlet line exhausting purge hydrogen discharged by the hydrogen purge valve to an air exhaust line at a cathode outlet of the fuel cell stack;
an inlet line branched from the outlet line and exhausting purge hydrogen to an air supply line at a cathode inlet of the fuel cell stack;
a vehicle state detector for detecting a vehicle state;
a controller for outputting a control signal for selecting either the cathode outlet or the cathode inlet of the fuel cell stack as an exhaust path of purge hydrogen based on the vehicle state detected by the vehicle state detector; and
a valve means capable of being opened and closed by a control signal of the controller to open one of flow paths of the inlet line and the outlet line such that purge hydrogen is discharged to either the cathode outlet or the cathode inlet of the fuel cell stack,
wherein the valve means comprises a first valve provided in the inlet line and a second valve provided in the outlet line, the inlet line is connected to either a front end or a rear end of a membrane humidifier or to either a front end or a rear end of an air blower in the air supply line at the cathode inlet of the fuel cell stack, and the outlet line is connected to either the front end or the rear end of the membrane humidifier in the air exhaust line at the cathode outlet of the fuel cell stack.

2. The fuel cell system of claim 1, wherein the vehicle state detector is a vehicle speed detector for detecting a vehicle speed and the controller outputs a control signal for selecting the exhaust path of purge hydrogen based on the vehicle speed detected by the vehicle speed detector.

3. The fuel cell system of claim 2, wherein the controller outputs a control signal for selecting the cathode outlet of the fuel cell stack as the exhaust path of purge hydrogen when the vehicle speed detected by the vehicle speed detector is above a predetermined reference speed and outputs a control signal for selecting the cathode inlet of the fuel cell stack as the exhaust path of purge hydrogen when the vehicle speed detected by the vehicle speed detector is below the reference speed.

4. The fuel cell system of claim 3, further comprising a power detector for detecting a power of the fuel cell stack, wherein the controller outputs a control signal for selecting the cathode outlet of the fuel cell stack as the exhaust path of purge hydrogen when the vehicle speed detected by the vehicle speed detector is below the reference speed and, at the same time, when the power of the fuel cell stack detected by the power detector is above a predetermined reference level.

5. The fuel cell system of claim 1, further comprising:
a water discharge line connected from a water trap for collecting water discharged from the fuel cell stack to the hydrogen exhaust line at the rear end of the hydrogen purge valve; and
a water discharge valve for controlling the water discharge from the water trap through the water discharge line,
wherein the water discharged from the water trap is introduced into the hydrogen exhaust line to be supplied to the air supply line together with the purge hydrogen discharged through the inlet line such that air supplied to the fuel cell stack is humidified.

6. The fuel cell system of claim 5, wherein the water discharge valve is opened and closed by a control signal of the controller and the controller periodically opens and closes the water discharge valve such that a predetermined amount of water in the water trap is periodically discharged.

7. The fuel cell system of claim 1, wherein the valve means comprises a first valve provided in the inlet line and a second valve provided in the outlet line.

8. The fuel cell system of claim 1, wherein the valve means is a switching valve provided in a position where the inlet line is branched from the outlet line and selectively switching the exhaust direction of purge hydrogen to one of the flow paths of the inlet line and the outlet line.

9. A motor vehicle comprising the fuel cell system for a fuel cell vehicle of claim 1.

10. A fuel cell for a fuel cell vehicle, comprising:
a hydrogen exhaust line;
a hydrogen purge valve provided in the hydrogen exhaust line;
an outlet line as a part of the hydrogen exhaust line at a rear end of the hydrogen purge valve;
an inlet line branched from the outlet line;
a vehicle state detector for detecting a vehicle state;
a controller; and
a valve means,
wherein the valve means comprises a first valve provided in the inlet line and a second valve provided in the outlet line, the inlet line is connected to either a front end or a rear end of a membrane humidifier or to either a front end or a rear end of an air blower in the air supply line at the cathode inlet of the fuel cell stack, and the outlet line is connected to either the front end or the rear end of the membrane humidifier in the air exhaust line at the cathode outlet of the fuel cell stack.

11. The fuel cell system for a fuel cell vehicle of claim 10, wherein the hydrogen exhaust line is provided at an anode outlet of a fuel cell stack.

12. The fuel cell system for a fuel cell vehicle of claim 10, wherein the outlet line exhausts purge hydrogen discharged by the hydrogen purge valve to an air exhaust line at a cathode outlet of the fuel cell stack.

13. The fuel cell system for a fuel cell vehicle of claim 10, wherein the inlet line exhausts purge hydrogen to an air supply line at a cathode inlet of the fuel cell stack.

14. The fuel cell system for a fuel cell vehicle of claim 10, wherein the controller outputs a control signal for selecting either the cathode outlet or the cathode inlet of the fuel cell stack as an exhaust path of purge hydrogen based on the vehicle state detected by the vehicle state detector.

15. The fuel cell system for a fuel cell vehicle of claim 10, wherein the valve means is capable of being opened and closed by a control signal of the controller to open one of flow paths of the inlet line and the outlet line such that purge hydrogen is discharged to either the cathode outlet or the cathode inlet of the fuel cell stack.

16. A motor vehicle comprising the fuel cell system for a fuel cell vehicle of claim 10.

17. The fuel cell system of claim 10, further comprising:
a water discharge line connected from a water trap for collecting water discharged from the fuel cell stack to the hydrogen exhaust line at the rear end of the hydrogen purge valve; and
a water discharge valve for controlling the water discharge from the water trap through the water discharge line, wherein the water discharged from the water trap is introduced into the hydrogen exhaust line to be supplied to the air supply line together with the purge hydrogen discharged through the inlet line such that air supplied to the fuel cell stack is humidified.

18. The fuel cell system of claim 17, wherein the water discharge valve is opened and closed by a control signal of the controller and the controller periodically opens and closes the water discharge valve such that a predetermined amount of water in the water trap is periodically discharged.

* * * * *